United States Patent [19]
Feldman et al.

[11] Patent Number: 5,864,413
[45] Date of Patent: Jan. 26, 1999

[54] PASSIVE OPTICAL NETWORK FOR DENSE WDM DOWNSTREAM DATA TRANSMISSION AND UPSTREAM DATA TRANSMISSION

[75] Inventors: Robert D. Feldman, Middletown; Clinton R. Giles, Morganville; Thomas H. Wood, Holmdel, all of N.J.

[73] Assignee: Lucent Technologies, Inc., Murray Hill, N.J.

[21] Appl. No.: 603,577

[22] Filed: Feb. 23, 1996

[51] Int. Cl.$^6$ .................................................... H04J 14/02
[52] U.S. Cl. .......................... 359/125; 359/118; 359/167
[58] Field of Search ................................ 359/118, 119, 359/120, 125, 126, 157, 164, 167, 168, 169, 170, 171

[56] References Cited

U.S. PATENT DOCUMENTS

| | | | |
|---|---|---|---|
| 5,311,344 | 5/1994 | Bohn et al. ............................... | 359/125 |
| 5,550,666 | 8/1996 | Zirngibl ................................... | 359/125 |
| 5,559,624 | 9/1996 | Darcie et al. ............................ | 359/125 |
| 5,574,584 | 11/1996 | Darcie et al. ............................ | 359/125 |
| 5,680,234 | 10/1997 | Darcie et al. ............................ | 359/110 |
| 5,680,490 | 10/1997 | Cohen et al. ............................. | 385/24 |
| 5,694,234 | 12/1997 | Darcie et al. ............................ | 359/125 |

Primary Examiner—Rafael Bacares

[57] ABSTRACT

A passive optical network for the downstream dense wavelength division multiplexing communication of data between a host terminal complex (HTC) and a plurality of optical network units (ONUs), and for the upstream communication of data from the ONUs to the HTC. The network includes a routing device for distributing downstream data signals contained in a common frequency band among a plurality of fiber drop lines for providing a corresponding wavelength to a corresponding ONU. The routing device also combines upstream data signals contained in a frequency band other than the downstream common frequency band, which are input to the routing device on the plurality of fiber drop lines, to a multi-wavelength signal which is provided to the HTC. In a preferred embodiment, the upstream data signals are output by the routing device to a broadcast port.

33 Claims, 3 Drawing Sheets

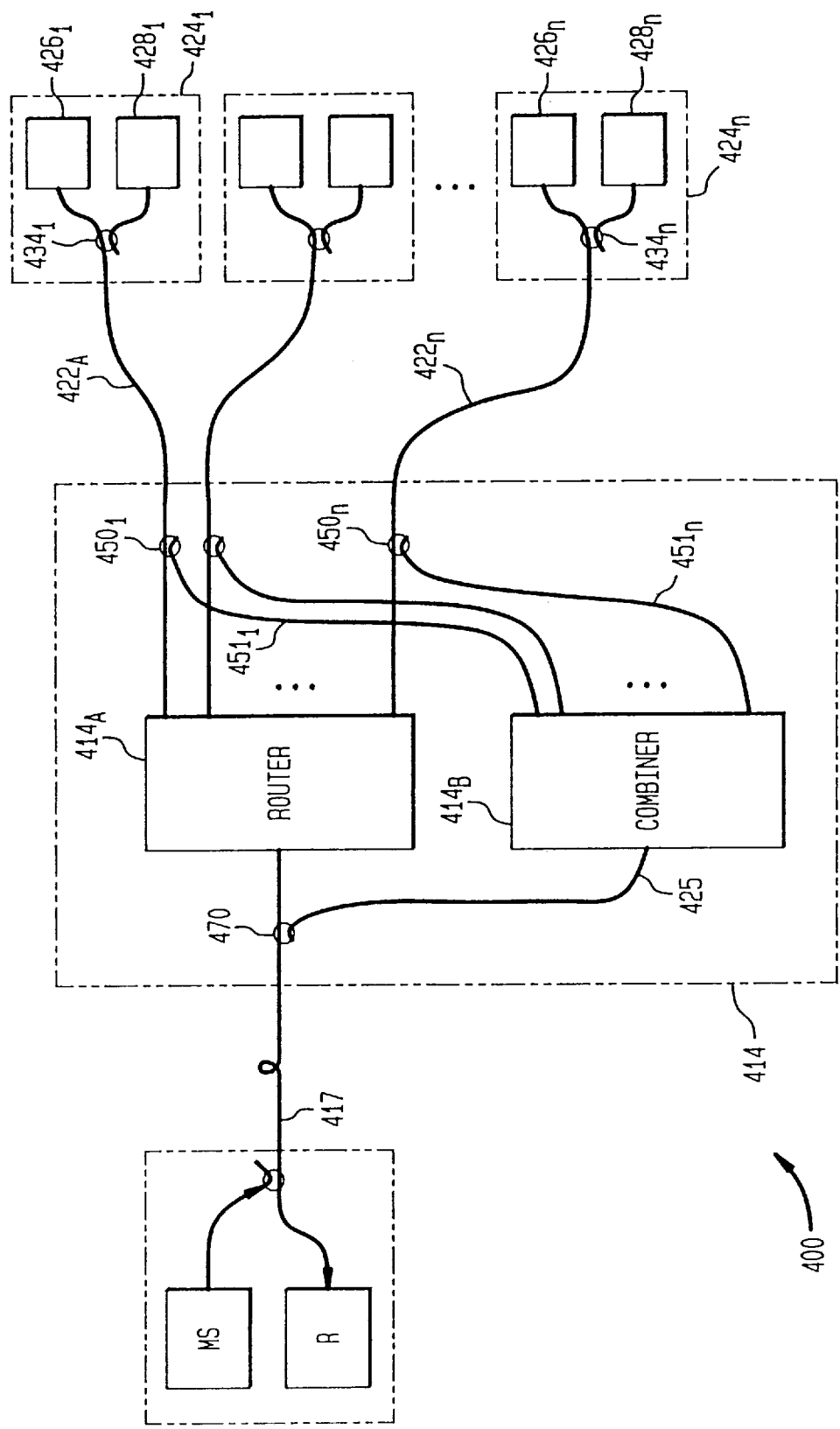

PASSIVE OPTICAL NETWORK FOR DENSE WDM DOWNSTREAM DATA TRANSMISSION AND UPSTREAM DATA TRANSMISSION

BACKGROUND OF THE INVENTION

I. Field of the Invention

This invention pertains to a passive optical network (PON) which provides for the transmission and reception of upstream and downstream data for communicating data between a host terminal complex (HTC) and a plurality of optical network units (ONUs). More particularly, the present invention relates to a bi-directional passive optical communication network for transmitting downstream dense wavelength division multiplexed (WDM) optical signals contained in a first frequency band to ONUs and for transmitting upstream optical data signals contained in a second frequency band to an HTC by using relatively inexpensive optical sources such as wideband (Fabry-Perot) lasers.

II. Description of the Related Art

Passive optical communication networks have gained increased importance for communicating data to and from remote locations. Such systems communicate information from central offices to individual living units (e.g. subscribers' homes), and from living units to the central offices. Current preferred PONs that transmit data from a host terminal complex over fiber optic cables to designated ONUs which service designated subscribers' terminal devices employ wavelength division multiplexing (WDM) techniques to transmit a plurality of optical data signals in the form of a plurality of wavelengths. WDM systems are preferred because, unlike time division multiplexing or power splitting systems, a designated wavelength is provided only to a corresponding ONU and not to the other ONUs connected to a common remote terminal. Thus, privacy is enhanced because each user location receives only its designated signal or channel. WDM systems are also preferred because each wavelength only carries information for a single ONU and, thus, the bit rate for each wavelength can be lower.

A prior art PON system for the downstream transmission of data is depicted in FIG. 1. As shown, PON 10 includes a multi-wavelength source (MS) such as a simultaneous multi-wavelength source (SMS) 12 contained in a host terminal complex (HTC) 13 which receives data, represented by incoming signals $X_1$–$X_n$. The incoming data X is converted to optical signals, in a manner well known to those having ordinary skill in the art and as for example more fully described in M. Zirngibl, et al., "*Demonstration Of A 9×200 Mbit/s Wavelength Division Multiplexed Transmitter,*" Electronics Letters, pp. 1484–1485, 1994. Each incoming data stream is represented by a separate and discrete wavelength $\lambda$, shown as $\lambda_1$–$\lambda_n$. The wavelengths are carried on a connection fiber 16 which provides a conduit for the data wavelengths between the SMS 12 and a router 14.

Router 14 contains an upstream port 18 and a plurality of downstream ports $20_1$–$20_n$ for routing downstream signals generated by the SMS 12 to select ones of a plurality of drop fiber lines $22_1$–$22_n$. The operation of a suitable router 14 is more fully described in U.S. Pat. No. 5,136,671. In general, router 14 contains multiple optical paths, each of which exhibits a particular passband. Each passband permits the passage of one or more particular wavelengths along the respective optical path, to the substantial exclusion of others. Thus, router 14 divides or separates the wavelengths present at the upstream port 18—which are contained in a common frequency band—into a plurality of discrete wavelengths and places each discrete wavelength on a designated output port 20. As shown, each drop fiber line 22 is connected to an optical network unit (ONU) 24 containing an optical receiver 26 for retrieving the data input to the SMS 12. Thus, the output of each ONU 24 shows the data signal X corresponding to the data signal input to SMS 12.

As will be appreciated, it is necessary for such PON systems to operate in a bi-directional manner. In other words, it is desirable to also communicate data in the upstream direction, i.e. for data generated from each ONU and received by the HTC 13. The upstream data is powered by a light source, such as an LED or laser. Although some prior art techniques exist for accomplishing this, the prior art techniques (which are discussed more fully below) all suffer various drawbacks which, inter alia, limit the capacity and rate of upstream data.

For example, bi-directional PON systems exist wherein a separate fiber network identical to PON 10 is constructed in the upstream direction except that a wavelength independent combiner is substituted for an upstream router. The wavelength independent combiner will pass substantially all wavelengths within a particular bandwidth. Such a system thus permits the use of less expensive lasers, i.e. lasers that need not be as finely tuned to the specific wavelengths which carry the upstream data, e.g. $\lambda_1'$–$\lambda_n'$, to pass through a bi-directional router. The combiner will combine or multiplex the various wavelengths ($\lambda'$) and provide the combined signal to a receiver contained in the HTC for retrieval of the upstream transmitted data. A significant drawback of such a duplicative system lies in its cost since duplicate upstream drop line fibers 22 are required for carrying the upstream optical signals from each ONU to the combiner.

Another prior art technique for transmitting upstream data through a PON is to incorporate at each ONU a separate single frequency laser such as a distributed feedback (DFB) laser. The type of laser used is dictated by the properties of the prior art routers. For example, conventional prior art routers are transparent to light only within a specified bandwidth. In other words, the router will transmit more power at some wavelengths than at other wavelengths to the upstream port. Accordingly, this property dictates the use of single frequency lasers as opposed to wideband Fabry-Perot lasers because single frequency lasers emit light at discrete wavelengths and may be finely tuned. Thus, light at specific wavelengths suitable for the router can be generated. In contrast, Fabry-Perot lasers generate light at various distinct frequencies or longitudinal modes and the optical power jumps between the modes in an unpredictable manner. Thus, it is difficult to adjust a Fabry-Perot laser so that even a portion of the generated light will reliably go through a conventional prior art router. Each DFB laser incorporated in such a system will be tuned to the specific ONU's transmitting wavelength. Thus, $ONU\ 24_1$ will incorporate a DFB laser for generating light at $\lambda_1'$; $ONU\ 24_n$ will incorporate a DFB laser tuned to $\lambda_n'$, etc. While such a system does not require duplicate drop lines to transmit the upstream data from the ONU 24 to the router 14, the multiple DFB lasers that are required are quite costly, and thus, significantly add to the expense of the overall PON system. In addition, the single frequency lasers require a costly mechanism to insure they remain at the desired wavelength.

An additional prior art technique used for transmitting upstream information in a PON is to employ a reflective modulator at each ONU for reflecting and modulating the downstream optical signal or light in the upstream direction.

The reflected light will, of course, be at the same wavelength as the downstream transmitted light and thus, will pass through the router for detection by a receiver in an HTC, whereupon the reflected light is demodulated to retrieve the transmitted upstream data. The main drawback associated with this technique, however, is that the reflected light must travel through the network twice, i.e. from the HTC to the designated ONU and then back to the HTC for reception. This makes such a system overly susceptible to fiber losses. In addition, these systems often require separate upstream and downstream fibers to avoid effects of reflection and Rayleigh scattering.

Still another technique in the prior art to transmit upstream data through a PON lies in the use of a broadband light source such as an LED contained in each ONU. The broadband source must be broad enough so that the router is transparent to some of the light, i.e. the router will pass one band of light going downstream and at least a portion of the light going upstream. The main drawback associated with such a system is that LEDs have low fiber coupled power. Thus, they do not generate enough power at the specific wavelengths carrying the upstream data. In addition, most of the broadband light is not passed by the router, and is thus wasted.

SUMMARY OF THE INVENTION

It would accordingly be desirable to have a high capacity PON for transmission of downstream optical signals to ONUs proximate customer premises and for receipt of upstream optical signals contained in a common bandwidth from ONUs, which overcomes the drawbacks of the prior art.

Accordingly, the present invention is directed to a passive optical network for communicating to a plurality of optical network units (ONUs), by wavelength division multiplexing, downstream optical data generated by a multi-wavelength source (MS) of an upstream host terminal complex (HTC) and having discrete wavelengths contained in a first frequency band. The network also communicates to the HTC upstream optical data generated by the plurality of ONUs and having wavelengths contained in a second frequency band.

The inventive network includes a feeder fiber optic cable connected at one end to the HTC for carrying the downstream optical data from the MS for distribution to the ONUs and for carrying the upstream optical data to the HTC. A means for routing the downstream and upstream optical data between the HTC and ONUs is also provided. The routing means has an upstream port and a plurality of downstream ports.

A plurality of optical fiber drops is also included. Each fiber drop has one end connected to a separate one of the plural downstream ports and an opposite end connected to a respective one of the plural ONUs for carrying downstream data in the form of a respective discrete wavelength contained in the first frequency band to the respective ONU, and for carrying upstream optical data in the form of wavelengths contained in the second frequency band and transmitted, at least in part, by a technique other than wavelength division multiplexing to the routing means. The upstream port of the routing means is connected to another end of the feeder fiber optic cable for communicating upstream optical data to the HTC and for distributing the downstream optical data to the ONUs. The routing means divides the downstream optical data into the discrete wavelengths and outputs each discrete wavelength to a respective optical fiber drop for receipt by a respective ONU and also combines the upstream signals into a single signal and outputs the combined signal to the feeder fiber optic cable for receipt by the HTC.

The present invention is also directed to a passive optical network for communicating to a plurality of optical network units (ONUs), by wavelength division multiplexing, downstream optical data generated by a multi-wavelength source (MS) of an upstream host terminal complex (HTC) and having discrete wavelengths contained in a first frequency band. The network also communicates to the HTC upstream optical data generated by the plurality of ONUs and having wavelengths contained in a second frequency band. The inventive network includes a feeder fiber optic cable connected at one end to the HTC for carrying the downstream optical data from the MS for distribution to the ONUs and for carrying the upstream optical data to the HTC. A means for routing the downstream and upstream optical data between the HTC and ONUs is also provided. The routing means has an upstream port and a plurality of downstream ports and combines substantially all of the upstream signals in the entire second frequency band with substantially equal efficiency.

A plurality of optical fiber drops is also included. Each fiber drop has one end connected to a separate one of the plural downstream ports and an opposite end connected to a respective one of the plural ONUs for carrying downstream data in the form of a respective discrete wavelength contained in the first frequency band to the respective ONU, and for carrying upstream optical data in the form of wavelengths contained in the second frequency band. The upstream port of the routing means is connected to another end of the feeder fiber optic cable for communicating upstream optical data to the HTC and for distributing the downstream optical data to the ONUs. The routing means divides the downstream optical data into the discrete wavelengths and outputs each discrete wavelength to a respective optical fiber drop for receipt by a respective ONU and also combines the upstream signals into a single signal and outputs the combined signal to the feeder fiber optic cable for receipt by the HTC.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote like elements throughout the several views.

FIG. 6 is a schematic representation of an alternate PON configuration in accordance with still another embodiment of the present invention.

DETAILED DESCRIPTION OF THE CURRENTLY PREFERRED EMBODIMENTS

Figure 1:
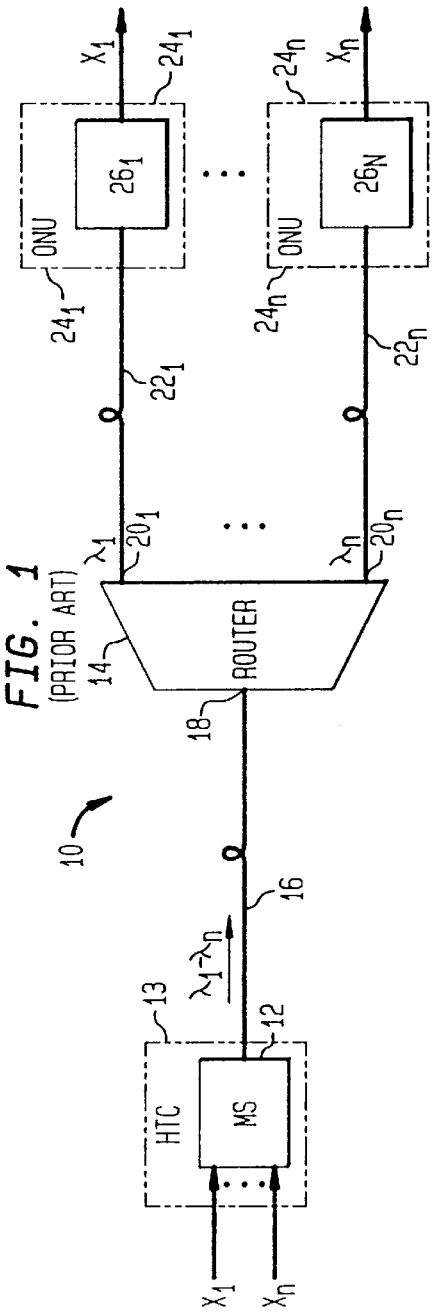
FIG. 1 is a schematic representation of a prior art PON showing downstream optical data transmission.
Figure 2:
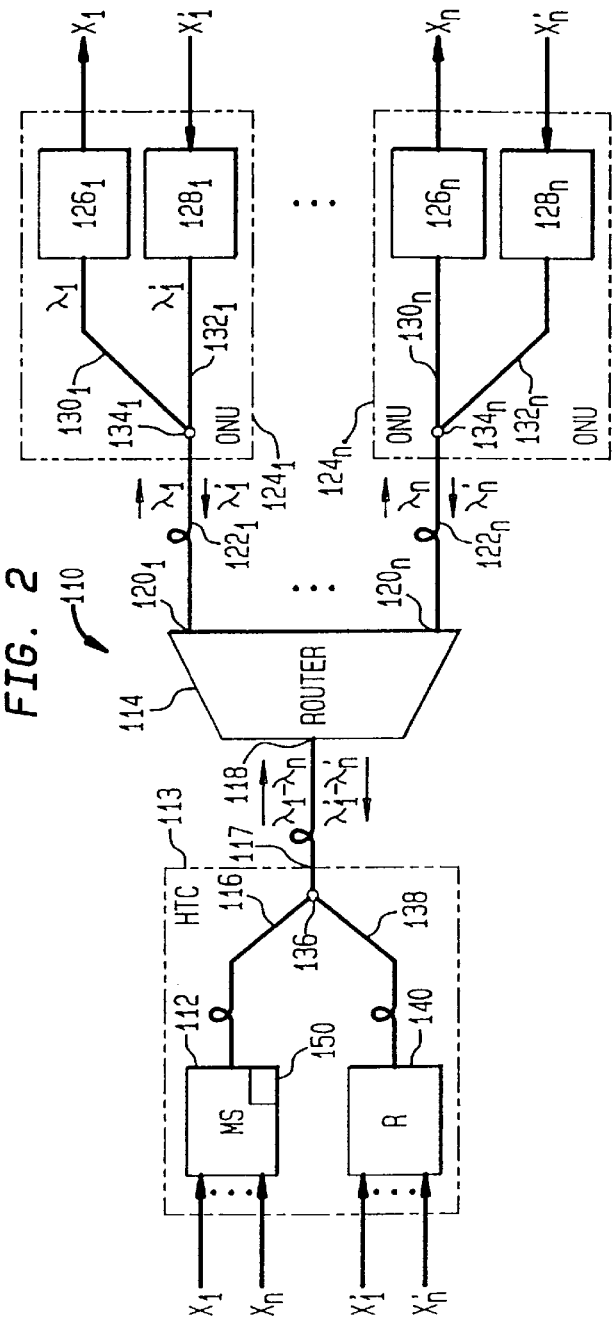
FIG. 2 is a schematic representation of an improved PON system constructed in accordance with one embodiment of the present invention.

Referring now to FIG. 2, a bi-directional PON configuration 110 constructed in accordance with the present invention is there depicted. A host terminal complex (HTC) 113 provides or communicates data to and from a routing means such as a router 114 which, in turn, is connected to a plurality of optical network units (ONUs) $124_1$–$124_n$. Router 114 divides or separates the wavelengths present at an upstream port 118—which are contained in a common frequency band—into a plurality of discrete wavelengths and places each discrete wavelength on a designated output port 120. PON 110 operates to communicate optical signal data in the downstream direction in a similar manner to PON 10 shown in FIG. 1. Specifically, HTC 113 includes a multi-wavelength source (MS) 112 which generates, either sequentially or simultaneously, optical signals of various frequencies and which receives a plurality of data bit streams $X_1$–$X_n$. The data bit streams are converted to optical signals by the MS, in a manner well known to those having ordinary skill in the art, and the optical signals which are represented by a plurality of wavelengths ($\lambda_1$–$\lambda_n$) are output on a main downstream connection fiber 116. The downstream optical data is, in turn, provided to a feeder fiber 117 via an upstream coarse wave division multiplexer (CWDM) 136 preferably included in the HTC 113.

The upstream CWDM 136 couples the main downstream connection fiber 116 to the feeder fiber 117 for communicating the downstream wavelengths $\lambda_1$–$\lambda_n$ to the upstream port 118 of router 114. The individual wavelengths comprising the downstream optical data are separated from each other, in a manner well known to those having ordinary skill in the art, by the router 114 and each discrete wavelength is output to the corresponding downstream router port 120 which is coupled to a corresponding drop line 122 for providing downstream optical data to a designated ONU 24 contained at or proximate a particular residence. For example, wavelength $\lambda_1$ is output on port $120_1$ and drop fiber line $122_1$ to provide ONU $124_1$ with downstream data. A similar arrangement is provided for the remaining discrete wavelengths in the downstream optical band.

Each downstream wavelength $\lambda$ is directed by its drop fiber line 122 to a downstream CWDM 134, preferably contained in each ONU, which is coupled to a designated downstream connection fiber 130 for coupling or connecting an ONU receiver 126 to a corresponding drop fiber line 122. Thus, $\lambda_1$ is coupled by CWDM $134_1$ to downstream connection fiber $130_1$ and fed to ONU $124_1$. Each ONU receiver 126 has detection and receiving circuitry such as a photodetector, as is known in the art, for receiving the downstream transmitted data, as well as an upstream transmitter 128 for transmitting upstream information. Thus, the output of ONU $124_1$ is shown in FIG. 2 as outputting data $X_1$, which corresponds to the data $X_1$ that was input to MS 112.

As noted above, it is also necessary for a PON to transmit data in the upstream direction. PON 110 accomplishes this function over the common plurality of drop fiber lines 122. For example, each ONU $124_1$ also includes a transmitter 128 which converts upstream data $X_1'$ to an optical signal via a light source such, for example, as a wideband or Fabry-Perot laser also included in the ONU. The optical upstream data having a wavelength designated by $\lambda_1'$ is deposited on an upstream connection fiber $132_1$. The upstream connection fiber is, in turn, connected to the downstream CWDM which, like downstream connection fiber $130_1$, couples the upstream connection fiber to the common drop fiber line $122_1$ for communicating the upstream data $\lambda_1'$ to router downstream port $120_1$. Thus, as shown, a single drop fiber line 122 is used as a conduit for both upstream optical signals $\lambda_1$ and downstream optical signals $\lambda_1'$.

In a manner akin to that described above, upstream information from the other ONUs 124 is also generated and provided to corresponding downstream ports 120 of router 114. As will be more fully described below, for certain router configurations the upstream optical wavelengths $\lambda'$ are contained in and occupy a frequency band separate and distinct from the frequency band containing the downstream optical wavelengths $\lambda$. This separation avoids interference between upstream and downstream data. For example, in the embodiment depicted in FIG. 2, the downstream signals may be contained, for example, in the bandwidth defined between 1530 nm and 1570 nm, whereas the upstream signals may be contained, for example, in the bandwidth defined between 1290 nm and 1350 nm. Nevertheless, router 114 is designed to pass with substantially equal efficiency, optical power in the entire upstream frequency band. Thus, the lasers contained in each ONU, which provide power for upstream optical data, can generate light having wavelengths within a relatively wide bandwidth (e.g. 1290 nm–1350 nm) as opposed to light at specific discrete wavelengths. As a consequence, wideband optical sources which are significantly less costly than controlled narrowband sources can be employed for upstream data transmission. Such sources may include, for example, LEDs, Fabry-Perot lasers, and single frequency sources that are not controlled.

Router 114 will pass or direct all of the upstream optical signals within the upstream optical bandwidth $\lambda_1'$–$\lambda_n'$ to the upstream port 118 for output to feeder fiber 117. The upstream CWDM 136 separates the upstream wavelengths $\lambda'$ from the downstream wavelengths $\lambda$ and the upstream data is then received and detected by a receiver (R) 140, of the HTC 113 for conversion of the detected optical signals back to the electronic data X'.

As explained above, PON 110 allows for non-tuneable wideband lasers, i.e. Fabry-Perot lasers or the like, to be used for the transmission of upstream optical signals. As such lasers operate within a particular bandwidth, a technique must be employed for distinguishing between upstream data generated from transmitter $128_1$ in ONU $124_1$ and upstream data generated from transmitter $128_2$ in ONU $124_2$. Known distinguishing or isolation techniques include time division multiple access (TDMA) and sub-carrier multiple access (SCMA); still other distinguishing techniques may be employed by those having ordinary skill in the art without departing from the spirit and intended scope of the subject invention. For example, since the upstream light falls on a common photodetector in the receiver 140, time division multiplexing and sub-carrier division multiplexing may be used to distinguish and decipher the various data contained in such light from the particular transmitters 128 which respectively generated the light.

In another preferred embodiment, it is desirable to transmit identical downstream data or broadcast data, along with the data $X_1$–$X_n$, to more than one ONU. This may be accomplished by utilizing an MS 112 capable of generating wavelengths in a third frequency band ($\lambda''$) which are distributed to the desired ONUs by the router 114. When such broadcasting is performed, CWDM 136 must also route the third frequency band signals onto fiber 117 and the CWDM for the desired ONU must route the third frequency band signals to the corresponding receivers 126.

Figure 3:
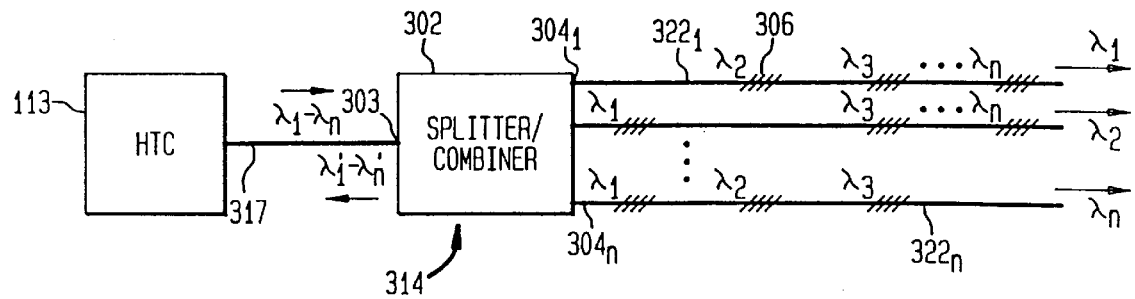
FIG. 3 depicts a combination demultiplexer and fiber grating device constructed in accordance with another embodiment of the present invention.

With reference now to FIG. 3, a preferred configuration of the router 114 will now be described. As shown, the routing function can be performed by a demultiplexing device 314, constructed as a combination splitter/combiner 302 having a plurality of reflective gratings 306 formed either on the drop fiber lines 322 or on waveguides internal to the splitter/combiner 302 and arranged in a pre-determined order to pass only the desired wavelength to each ONU. The splitter/combiner 302 is interfaced with a feeder fiber 317 connected to HTC 113. As discussed above in respect of the embodiment of FIG. 2, HTC 113 generates optical data having wavelengths within the range of $\lambda_1$–$\lambda_n$ which are directed through an upstream port 303 to splitter/combiner 302. The full spectrum of downstream light ($\lambda_1$–$\lambda_n$) is divided into discrete signals containing particular wavelengths in the full spectrum and each signal is provided to a corresponding drop fiber 122 connected to a corresponding ONU. In the case of external reflective gratings, when each signal exits the splitter/combiner 302 in the downstream direction, the light is acted upon by the plurality of the reflective gratings 306.

For example, and with specific reference to drop fiber 322$_1$, when light within the downstream bandwidth passes through the first reflective grating (designated as $\lambda_2$), light having a wavelength of $\lambda_2$ is reflected back to the splitter/combiner 302 and does not reach the ONU connected to drop fiber 322$_1$. Likewise, the remaining light (having wavelengths $\lambda_1$, $\lambda_3$–$\lambda_n$) is acted upon by reflective grating $\lambda_3$ to remove or reflect back light having a wavelength of $\lambda_3$ so that the $\lambda_3$ light does not reach the ONU. When the last reflective waveguide acts upon the light remaining on drop fiber 322$_1$, the remaining light is only of wavelength $\lambda_1$. A similar situation occurs for the remaining drop fibers. Thus, the reflective gratings on drop fiber 122$_2$ are configured to reflect all wavelengths within the downstream bandwidth except for $\lambda_2$, etc.

In the upstream direction, however, it is intended that all upstream optical data be transmitted at wavelengths contained in a bandwidth outside of the bandwidth defined by $\lambda_1$–$\lambda_n$, i.e. within a bandwidth $\lambda_1'$–$\lambda_n'$. The reflective gratings formed in the plurality of drop fiber lines 322 will not reflect or otherwise obstruct the passage of such upstream light through the drop fibers as such light is contained within a separate bandwidth. Thus, upstream signals will be combined by splitter/combiner 302 and the resulting combined optical signal will output to feeder fiber 317 for receipt, in a manner well known in the art and as briefly discussed hereinabove, by an optical receiver in the HTC 113. Accordingly, for the router of FIG. 3 to function in the intended manner, the upstream optical data signals must be within a frequency band different than the frequency band containing the downstream optical data signals. A more detailed description of the router 314 may be found in V. Mizrahi et al., *Four Channel Fibre Grating Demultiplexer,* Electronics Letters, 12th May 1994, Vol. 30, No. 10, pp. 780–781.

Figure 4:
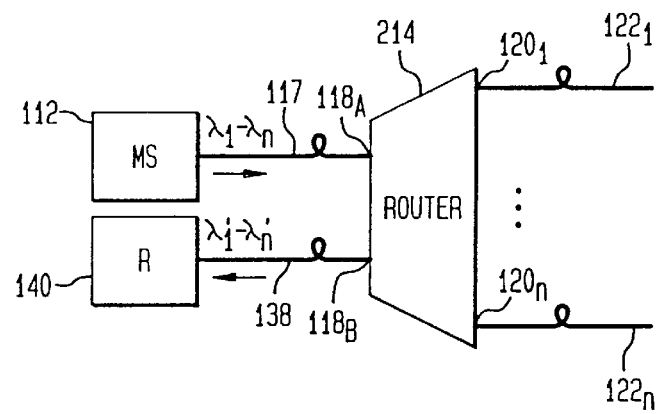
FIG. 4 illustrates a router constructed in accordance with yet another embodiment of the present invention.

FIG. 4 depicts another preferred configuration for the router 114 that is shown in FIG. 2. In FIG. 4, router 214 includes two upstream ports 118$_A$ and 118$_B$. Port 118$_B$ functions as a broadcast port to which all upstream optical data is routed by router 214. As should be readily apparent, in such a system a second feeder fiber 138 for specific transmission of upstream optical data from router 214 to the receiver 140 is required. As also shown, upstream feeder fiber 138 carries optical data in the range of $\lambda_1'$–$\lambda_n'$ to receiver 140. As should also be apparent, since a separate upstream data port (broadcast port) is included, the frequency bands of the upstream and downstream data signals need not be separated because the data signals no longer share the same feeder fiber. When the upstream and downstream frequency bands overlap, CWDMs 134 will need to be replaced with wavelength independent splitter/combiners, as is known in the art.

Figure 5:
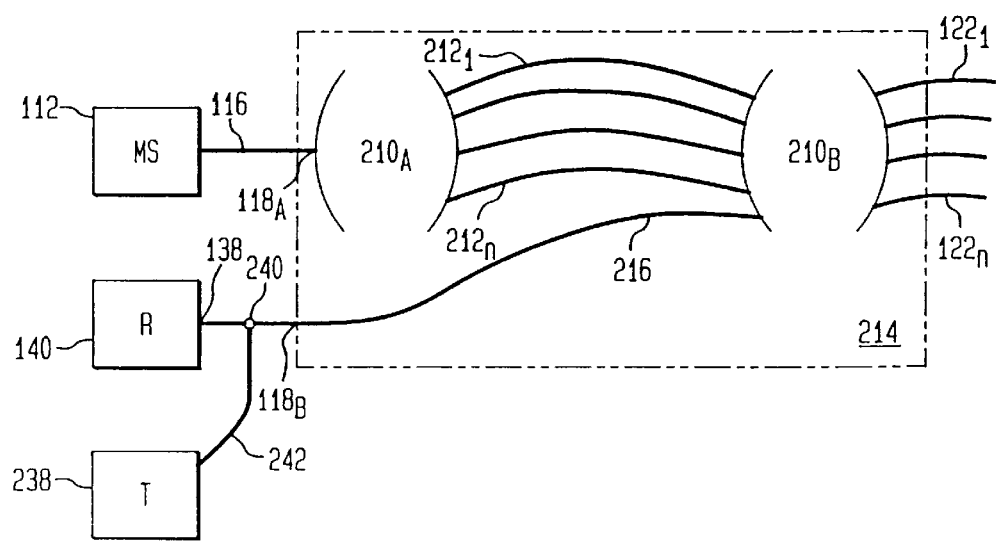
FIG. 5 is a semi-schematic representation of the router of FIG. 4.

A semi-schematic representation of the router 214 of FIG. 4 is depicted in FIG. 5. In general, router 214 contains first and second free optical expansion regions 210$_A$ and 210$_B$ connected to each other via a plurality of waveguides 212$_1$–212$_n$. The downstream ports of router 214 are variously connected to the plurality of drop lines 122$_1$–122$_n$ which carry optical data to and from router 214. When upstream data is generated by, for example, the ONU transmitters, the upstream data occupies a bandwidth separate and distinct from the bandwidth containing the downstream data. As the optical signals enter the second free optical expansion region 210$_B$, the entire bandwidth of upstream optical signals ($\lambda_1'$–$\lambda_n'$) is conveyed to each waveguide 212 which terminates at the first free optical expansion region 210$_A$. However, an extra waveguide 216 is included which is not common to both free optical expansion regions and which extends from the second free optical expansion region 210$_B$ to the receiver 140. Waveguide 216, like waveguides 212, contains the full bandwidth or spectrum of the upstream optical signals. The upstream spectrum from waveguide 216 is thus output on broadcast port 118$_B$ for receipt and detection by receiver 140. A more detailed description of the operation of the router of FIGS. 4 and 5 may be found in U.S. Pat. No. 5,440,416.

In another preferred embodiment, a system incorporating the router of FIGS. 4 and 5 may include another transmitter 238 included in the HTC for transmitting broadcast data to select ONUs. As shown, transmitter 238 is connected to the extra waveguide 216 via a drop line 242 and a CWDM or splitter/combiner 240. In the alternative, MS 112 may also be used for transmitting broadcast data. In such a configuration, of course, drop line 242 and CWDM 240 are not required, as the broadcast data can be sent over fiber 116.

With reference now to FIG. 6, still another PON system 400 in accordance with the invention is there depicted. As shown, a coupling device 414 is interfaced with and connects an HTC 413 to a plurality of ONUs 424. The PON system 400 depicted in FIG. 6 is similar to the system 110 of FIG. 2 except that the bi-directional router 114 of the FIG. 2 arrangement has now been replaced with a coupling device 414 comprising a uni-directional router 414$_A$ for transmitting downstream optical signals and a wavelength independent combiner 414$_B$ for transmitting upstream optical signals. Coupling device 414 also includes a plurality of downstream CWDMs 450 each connected to a respective drop fiber 422 for removing the upstream data signals from the drop line and directing such upstream signals to combiner 414$_B$ via connecting fibers 451 in which the signals are combined and then output on an upstream fiber 425 for coupling to the common feeder fiber 417 via an upstream CWDM 470. As an alternative to upstream CWDM 470, a separate feeder fiber may be included for providing upstream data from combiner 414$_B$ to the HTC. The system depicted in FIG. 6 thus advantageously accommodates the use of a router in conjunction with a wavelength independent combiner. In this particular embodiment, the router 414$_A$, combiner 414$_B$, downstream CWDMs 450 and upstream CWDM 470 may be conveniently constructed as a single unit or device. As with the embodiment of FIGS. 4 and 5, the embodiment of FIG. 6 can also be used to transmit broadcast data to particular ONUs provided, however, that the broadcast data does not occupy the wavelengths filtered out by gratings 306.

It should be readily understood that any of the routing means described hereinabove can be employed for simultaneously directing downstream optical data to the desired ONUs and for directing upstream optical data to the HTC. Some such routers, however, such as router 214 require the addition of a separate feeder fiber 138.

As should by now be appreciated, the various hereinabove described embodiments of the present invention permit the transmission in a downstream direction of dense wavelength division multiplexed signals while simultaneously accommodating signals transmitted upstream, at least in part, by a technique other than WDM. The upstream transmission can now be accomplished using relatively inexpensive wideband sources, such, for example, as Fabry-Perot lasers, LEDs or single frequency sources that are not finely tuned, at each ONU as opposed to the significantly more costly controlled wavelength single frequency lasers because routing means are employed which pass with substantially equal efficiency, optical power in the entire upstream frequency band. Experimental testing of the PON system of FIG. 2 yielded an eight channel WDM downstream data transmission rate of 50 Mb/s and an eight channel upstream SCMA data transmission rate of 3 Mb/s.

Thus, while there have shown and described and pointed out fundamental novel features of the invention as applied to preferred embodiments thereof, it will be understood that various additions, omissions, substitutions and changes in the form and details of the devices illustrated, and in their operation, may be made by those skilled in the art without departing from the spirit of the invention. For example, with specific reference to FIG. 2 a feed-forward compensation circuit 50, as is known in the art, may be employed to reduce cross-talk between wavelengths in the MS in that and each of the various embodiments of the invention. It is expressly intended, therefore, that all combinations of those elements which perform substantially the same function in substantially the same way to achieve the same results are within the scope of the invention. It is accordingly the intention to be limited only as indicated by the scope of the claims appended hereto.

We claim:

1. A passive optical network for communicating to a plurality of optical network units (ONUs), by wavelength division multiplexing, downstream optical data generated by a multi-wavelength source (MS) of an upstream host terminal complex (HTC) and having discrete wavelengths contained in a first frequency band, and for communicating to the HTC upstream optical data generated by the plurality of ONUs and having wavelengths contained in a second frequency band, said network comprising:

a feeder fiber optic cable having a first end and a second end, said first end connected to the HTC for carrying the downstream optical data from the MS for distribution to the ONUs and for carrying the upstream optical data to the HTC;

means for routing the downstream and upstream optical data between the HTC and ONUs and having at least one upstream port and a plurality of downstream ports, said routing means being capable of routing a continuous spectrum of optical wavelengths, said continuous spectrum including the second frequency band;

a plurality of optic fiber drops, each having one end connected to a separate one of said plurality of downstream ports and an opposite end connected to a respective one of said plurality of ONUs for carrying downstream data in the form of a respective discrete wavelength contained in the first frequency band to the respective ONU, and for carrying upstream optical data in the form of wavelengths contained in the second frequency band and transmitted to said routing means;

said upstream port of said routing means being connected to said second end of said feeder fiber optic cable for communicating upstream optical data to the HTC and for distributing the downstream optical data to said ONUs, said routing means being operable for dividing the downstream optical data into the discrete wavelengths and outputting each discrete wavelength to a respective optical fiber drop for receipt by a respective ONU, and for combining wavelengths in said second frequency band carrying said upstream optical data into a single signal, at least in part by a technique other than wavelength division multiplexing, and outputting said single signal to said feeder fiber optic cable for receipt by said HTC.

2. The network of claim 1, wherein said routing means combines substantially all upstream signals in the entire second frequency band with substantially equal efficiency.

3. The network of claim 2, wherein said routing means further comprises a plurality of optical filters that direct selective wavelengths within said first frequency band so that the directed wavelengths remain on each respective optical fiber drops cable.

4. The network of claim 3, wherein said optical filters comprise gratings formed on said plurality of optical fiber drops cables.

5. The network of claim 1, wherein the HTC also generates downstream optical data in a third frequency band so that the optical data in the third frequency band is directed to more than one ONU in said plurality of ONUs.

6. The network of claim 1, wherein said routing means further comprises an upstream broadcast port, wherein the upstream data is output by said broadcast port and wherein said feeder fiber optic cable further comprises a first and second feeder fiber optic cable, said first cable connected at one end to the HTC and at the other end to said upstream port for carrying downstream optical data from the HTC, and said second cable connected at one end to the HTC and at the other end to said broadcast port for carrying the upstream data to the HTC.

7. The network of claim 3, wherein the second frequency band has wavelength values other than the wavelength values contained in the first frequency band.

8. The network of claim 3, wherein each ONU contains a receiver for receiving downstream optical data and a transmitter for transmitting upstream optical data, said network comprising downstream coupling means for connecting each said optical fiber drop in said plurality to the transmitters and receivers located in said corresponding ONUs.

9. The network of claim 8, wherein said downstream coupling means comprises a coarse wave division multiplexer included in each of the ONUs.

10. The network of claim 8, wherein the HTC further includes a receiver for receiving the upstream optical data, said network further comprising an upstream coupling means for connecting said feeder fiber to the multi-wavelength source and the receiver of the HTC.

11. The network of claim 10, wherein said upstream coupling means comprises a coarse wave division multiplexer included in the HTC.

12. The network of claim 6, wherein each ONU contains a receiver for receiving downstream optical data and a transmitter for transmitting upstream optical data, said network comprising downstream coupling means for connecting each said optical fiber drop in said plurality to the transmitters and receivers of said corresponding ONUs.

13. The network of claim 12, wherein said downstream coupling means comprises a coarse wave division multiplexer included in each of the ONUs.

14. The network of claim 1, wherein said routing means comprises a router for distributing the downstream optical data to the ONUs, and a combiner for combining the second frequency band into a single signal and outputting said single signal to said feeder fiber optic cable.

15. The network of claim 14, wherein said upstream optical data has wavelength values other than the wavelength values defined by the first frequency band.

16. The network of claim 15, further comprising an upstream fiber for carrying said single signal from said combiner, and a coupling means for coupling said upstream fiber to said feeder fiber optic cable for supplying said single signal to the HTC.

17. The network of claim 14, wherein said feeder fiber optic cable further comprises a first and second feeder fiber optic cable, said first cable connected at one end to the HTC and at the other end to said router for carrying downstream optical data from the HTC, and said second cable connected at one end to the HTC and at the other end to said combiner for carrying the upstream data to the HTC.

18. The network of claim 16, wherein each ONU contains a receiver for receiving downstream optical data and a transmitter for transmitting upstream optical data, said network comprising downstream coupling means for connecting each said optical fiber drop in said plurality to the transmitters and receivers of said corresponding ONUs.

19. The network of claim 18, wherein said downstream coupling means comprises a coarse wave division multiplexer included in each of the ONUs.

20. The network of claim 19, wherein the HTC further includes a receiver for receiving the upstream optical data, said network further comprising an upstream coupling means for connecting said feeder fiber to the multi-wavelength source and the receiver of the HTC.

21. The network of claim 20, wherein said upstream coupling means comprises a coarse wave division multiplexer included in the HTC.

22. The network of claim 1, wherein said technique other than wavelength division multiplexing comprises time division multiplexing.

23. The network of claim 1, wherein said technique other than wavelength division multiplexing comprises subcarrier multiplexing.

24. The network of claim 1, wherein the multi-wavelength source simultaneously generates optical data signals at discrete wavelengths contained in the first frequency band.

25. The network of claim 1, wherein the HTC is capable of sequentially generating optical data signals at discrete wavelengths contained in the first frequency band.

26. The network of claim 1, wherein the ONUs include wideband optical sources for transmitting upstream data.

27. A passive optical network for communicating to a plurality of optical network units (ONUs), by wavelength division multiplexing, downstream optical data generated by a multi-wavelength source (MS) of an upstream host terminal complex (HTC) and having discrete wavelengths contained in a first frequency band, and for communicating to the HTC upstream optical data generated by the plurality of ONUs and having wavelengths contained in a second frequency band, said network comprising:

a feeder fiber optic cable having a first end and a second end, said first end connected at one end to the HTC for carrying the downstream optical data from the MS for distribution to the ONUs and for carrying the upstream optical data to the HTC;

a means for routing the downstream and upstream optical data between the HTC and ONUs and having at least one upstream port and a plurality of downstream ports, said routing means being capable of routing a continuous spectrum of optical wavelengths, said continuous spectrum including the entire second frequency band, and combining substantially all upstream wavelengths in the entire second frequency band with substantially equal efficiency;

a plurality of optic fiber drops, each having one end connected to a separate one of said plurality of downstream ports and an opposite end connected to a respective one of said plurality of ONUs for carrying downstream data in the form of a respective discrete wavelength contained in the first frequency band to the respective ONU, and for carrying upstream optical data in the form of wavelengths contained in the second frequency band and transmitted to said routing means;

said upstream port of said routing means being connected to said second end of said feeder fiber optic cable for communicating upstream optical data to the HTC and for distributing the downstream optical data to said ONUs, said routing means dividing the downstream optical data into the discrete wavelengths and outputting each discrete wavelength to a respective optical fiber drop for receipt by a respective ONU, and for combining said upstream signals into a single signal and outputting said single signal to said feeder fiber optic cable for receipt by said HTC.

28. The network of claim 27, wherein said upstream optical data is transmitted, at least in part, by a technique other than wavelength division multiplexing.

29. The network of claim 27, wherein said routing means further comprises a plurality of optical filters that direct selective wavelengths within said first frequency band so that the directed wavelengths remain on each respective optical fiber drops cable.

30. The network of claim 29, wherein said optical filters comprise gratings formed on said plurality of optical fiber drops cables.

31. The network of claim 27, wherein the HTC also generates downstream optical data in a third frequency band so that the optical data in the third frequency band is directed to more than one ONU in said plurality of ONUs.

32. The network of claim 27, wherein said routing means further comprises an upstream broadcast port, wherein the upstream data is output by said broadcast port and wherein said feeder fiber optic cable further comprises a first and second feeder fiber optic cable, said first cable connected at one end to the HTC and at the other end to said upstream port for carrying downstream optical data from the HTC, and said second cable connected at one end to the HTC and at the other end to said broadcast port for carrying the upstream data to the HTC.

33. The network of claim 27, wherein the ONUs include wideband optical sources for transmitting upstream data.

* * * * *